United States Patent [19]

Vonasek

[11] Patent Number: 4,875,058

[45] **Date of Patent: * Oct. 17, 1989**

[54] VALVE DEVICE FOR A MATRIX PRINTER

[75] Inventor: Jiri Vonasek, Kungälv, Sweden

[73] Assignee: Markpoint System AB, Gothenburg, Sweden

[ * ] Notice: The portion of the term of this patent subsequent to Apr. 12, 2005 has been disclaimed.

[21] Appl. No.: 130,531

[22] Filed: Dec. 9, 1987

[30] Foreign Application Priority Data

Dec. 12, 1986 [SE] Sweden .............................. 86 05348
Nov. 25, 1987 [SE] Sweden .............................. 87 04675

[51] Int. Cl.$^4$ .............................. G01D 15/16

[52] U.S. Cl. .............................. 346/140 R; 346/75; 136/883; 251/85

[58] Field of Search ............ 346/75, 140 PD; 251/84, 251/85, 129.15, 129.2, 359, 368, 357, 87, 333; 137/883, 516.25

[56] References Cited

U.S. PATENT DOCUMENTS

| | | | |
|---|---|---|---|
| 3,605,793 | 9/1971 | Kinsel | 251/357 |
| 3,837,617 | 9/1974 | Eminger et al. | 251/87 |
| 4,378,564 | 3/1983 | Cross et al. | 346/75 |
| 4,539,570 | 9/1985 | Moore | 346/75 |
| 4,576,111 | 3/1986 | Slomianny | 346/140 PD |
| 4,736,774 | 4/1988 | Vonasek | 346/75 |

OTHER PUBLICATIONS

PCT Publication "Ink Jet Printing System" to Barney U.S. Classification.

*Primary Examiner*—E. A. Goldberg
*Assistant Examiner*—Huan Tran
*Attorney, Agent, or Firm*—Fleit, Jacobson, Cohn, Price, Holman & Stern

[57] ABSTRACT

A valve device for matrix printers of the ink jet type.

The device is arranged for providing a liquid tight closure and opening of a passage for generating a portion of a character by the output of a certain amount of liquid for character recording through said passage.

Armatures, each one having an end portion are arranged as valve bodies in the passages, and means are arranged for operating the armatures in a reciprocating movement for obtaining said closure and opening functions.

A plate shaped element is the element wherein the passages are formed and comprises a grindable element, which is such that it is grindable to a smooth condition with long term smoothness and generally free from internal strains.

The end portion or valve head of each armature has at least partially a smooth surface arranged for being directly brought into abutment against the smooth grinded element, around the opening of the passage facing the armature.

The combined smoothness between the armature end portion and the smooth grinded valve surface around the passage is such that at least a molecular layer of the character recording liquid permanently exists between each end portion and valve seat.

In a further embodiment the valve head is connected to the armature by a flexible portion, which allows angle positioning of the valve head relative the longitudinal axis of the armature. This means that under the influence of the spring member, the head may be brought into a parallel abutment against a plate of non-resilient material having ink outlet openings therein.

17 Claims, 3 Drawing Sheets

VALVE DEVICE FOR A MATRIX PRINTER

FIELD OF THE INVENTION

The present invention relates to a device a for providing liquid tight closure and opening, respectively, of a passage in a printer device where a portion of a character is generated by releasing a certain amount of a liquid, for instance ink, suitable for character recording through the passage.

BACKGROUND OF THE INVENTION

Of course, there are previously known valve devices for such an operation. However, such devices are all dependent on a resilient material for providing a seal, a liquid tight seal, between a nozzle or corresponding element and the end of the reciprocating armature that controls the output.

Said resilient material is arranged as a thick layer onto the plate shaped element where nozzles or corresponding passages are formed. By bringing the end of the armature in abutment against the resilient layer around the nozzles, the prior art technique provides a liquid tight "joint" between the armature and the nozzle.

However, defects indicate that said known layers of a resilient material do not resist long term strain in a sufficient degree meaning that cracks are formed, the material expands or shrinks. The influence of the actual type of ink is also substantial which is very clearly noticeable. Furtheron, there is a need for shifting between different ink types, for instance solvent based, generally alcohol based inks and water based inks. In order to do this, however, there is needed a cumbersome and very time consuming conditioning of the resilient layers.

The object of the present invention is to eliminate said drawback and offer a more advantageous alternative. A further object is to provide an efficient seal between the armature valve head and an output plate, without the need for an exact and time consuming adjustment operation.

SUMMARY OF THE INVENTION

The present invention offers a device for providing a liquid tight closure and opening, respectively, of a passage in a printer device for generating a portion of a character by the output of a certain amount of liquid for character recording, for instance ink, through the passage, comprising an armature having an end portion arranged as a valve body of the passage, and means for a controlled armature reciprocating movement for accomplishing said sealing and opening functions.

The device is characterized in the the passage is formed in a plate-shaped, grindable element that is grindable to a smooth condition with maintained smoothness and substantially free from internal stresses, and that the end portion has an at least partially smooth surface arranged for being brought directly into abutment against the smooth grinded element around the opening of the passage facing the armature.

In printers of said type there is a need for a perfect or at least fully acceptable seal and the highest possible printing speed within defined printing quality limits, and all this means high precision demands. For instance, the stroke length of the valve body is at a maximum approximatively 0,2 mm and the cycle time of an opening and closing operation is about 1 millisecond. This means that the adjustment between the plate and each individual valve head in an ink jet printer has to be carried out very precisely by using a microscope, in order to reach the desired sealing degree. A small leakage to an ink output opening means that the droplet following to this leakage will be deformed and the quality of the print will deteriorate.

In one embodiment of the present invention there is provided an efficient seal between the valve head and the output plate, without the need for an exact and time consuming adjustment operation.

The said embodiment is characterized in that each valve head is connected to the armature by a flexible portion that allows an angle positioning of the valve head relative the longitudinal axis of the armature, such that the head may be brought into a parallel abutment against a plate of not resilient material having ink output openings formed therein.

Preferably, the flexible portion extends to a spring member inserted between the said valve head and a coaxial sleeve.

This means that the valve head being pressed by the spring for sealing against the plate is easy movable in the direction of the longitudinal axis of the armature.

Preferably, an electromagnet is arranged for attracting the valve head against the action from the spring member, from a rest position with the head in abutment against the plate. This means that the flexible portion merely will be affected by stretching forces.

The flexible portion preferably consists of a wire drawn from a spring steel. In this manner the desired flexibility may be provided by simple means.

According to an alternative embodiment of the invention the wire is arranged in a central bore in the armature and valve head, respectively, by means of a binder. Alternatively, the spring may be arranged in the armature and valve head, respectively, by shrinking.

The design of the valve head according to the present invention takes due consideration of the fact that the system should have a sufficient mechanical stability but at the same time a minor hydraulic attenuation. It has been found that the relation between the cross section area of the head to a respective area of an opening should fall within the interval 1:5–1:10.

An advantageous compromise is obtained by giving the generally completely smooth head end a very shallow, some $\mu$m deep recess, which is surrounded by a circumferential absolutely smooth edge surface. In this manner the adhesion forces may be reduced and conditions created for still higher operation speed.

In one preferable embodiment of the invention the material of the plate has been selected as an individual one or a combination of materials from the following group: quartz glass, ceramics, for instance $BrO_2$, $AlO_2$, hard metal sintered carbide (metal and ceramics) and reinforced plastics, for instance carbon fibre reinforced plastics.

In applications where electromagnetic driving is used, the armature, with the smooth grinded, at least partial end portion thereof, is formed from a magnetic material, preferably stainless steel or a ferrite.

The combined smoothness of the armature end portion acting as a valve body and the smooth grinded valve seat around the passage preferably are such that at least a molecular layer of character recording liquid permanently exists between the end portion and the valve seat, resulting in an effective wear resistance.

In one embodiment the armature is supported in a sleeve shaped guide device, and a spring device, providing a directed force in the centre axis direction and parallel to the sleeve axis, acts on the armature as soon as it is brought from a rest position.

Preferably, the spring is a helical spring having one end attached to the sleeve and the other end close to the armature end portion, and the spring cross section is arranged for diminishing in the direction of the end portion.

In one embodiment an electromagnetic coil is arranged at the end of the passage distal to the armature.

Preferably, the total extension of the passage coincides with the thickness of the plate shaped element, which is relatively thin, within the interval of some millimetres, and thereby gives a short passage.

DESCRIPTION OF PREFERRED EMBODIMENTS

Figure 1:
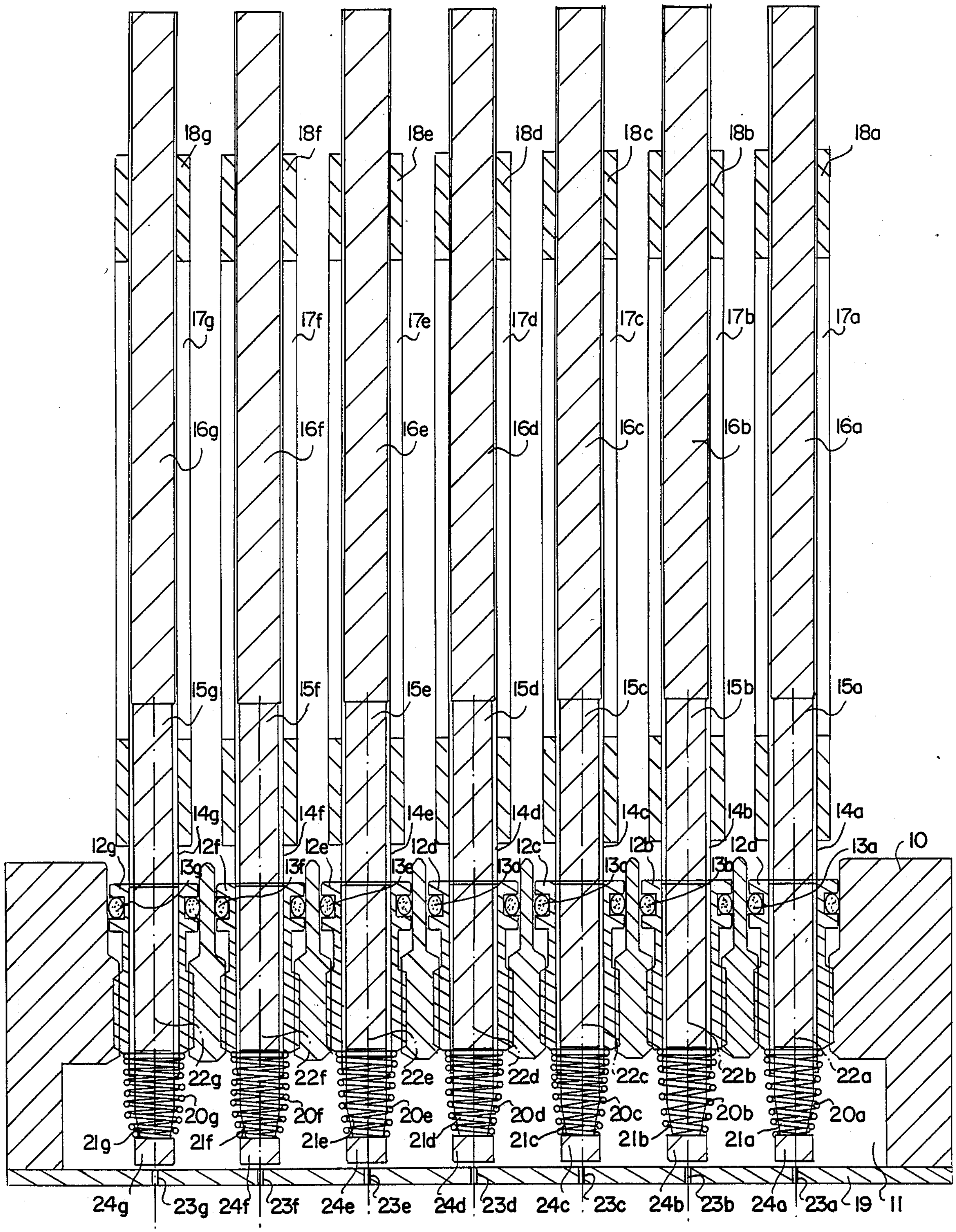
FIG. 1 is a cross section of a matrix printer of the ink jet type according to the present invention.

In a housing 10 there is arranged a pressurized ink chamber 11. In the housing 10 seven openings are formed, each one being closable by a sleeve shaped element 12*a–g*. Said sleeves support seal gaskets 13*a–g*, such that liquid within the chamber 11 may not flow out between the housing and a sleeve 12*a–g*. In a respective one of the sleeves there is an additional sleeve 14*a–g* acting as a guide for an armature 15*a–g*. Each sleeve 14*a–g* is sealed by an end plug 16*a–g*, such that liquid from the housing 10 may rise to a maximum level at the lower end of a respective end plug. Said "end plugs" 16*a–g* act as cores for electromagnetic coils (not shown), each one being placed in a recess 17*a–g* in upper sleeves 18*a–g*. The magnetic field from each one of said coils will be concentrated to the upper end region of a respective armature 15*a–g* for attracting the corresponding armature 15*a–g* from a lower plate 19 of the housing when energizing a respective one of the coils. Such upwards movement takes place against the action from a spring 20*a–g* for each individual armature. Said springs each are placed and shaped such that the upper ends are attached in a respective sleeve 12*a–g* and the lower ends abut a recess 21*a–g* in each one of the armature ends 24*a–g*. The cross section of the springs diminishes in a direction towards the armature ends, meaning that the springs provide a force which is parallel to a respective one of the sleeve axis and centered around the centre axis as soon as the armature is displaced from the position shown in FIG. 1. Thereby an efficient centering of the upwards and downwards movement is obtained and wear is prevented.

In the plate 10 there are formed passages 23*a–g*, which act as the passage mentioned at the introduction for generating of a portion of a character as soon as a passage is opened up by a corresponding armature end portion 24*a–g*. In the embodiment according to FIG. 1, the end plate 19 is relatively thin, of the thickness of some millimeters, meaning that the passages 23*a–g* will be short and allow a fast reaction and reliable operation.

Additionally, and maybe most important, the plate 19 has a very specific structure, i.e. it is formed by a grindable material which is grindable to a smooth condition with long term maintained smoothness and generally free from internal strains.

As useful materials there may be mentioned quartz glass, ceramics, for instance $BrO_2$, $AlO_2$, hard metal sintered carbides (metal and ceramics) and reinforced plastics, for instance carbon fibre reinforced plastics.

However, in order to fully use the said characteristic of the end plate 19, the actual embodiment according to the present invention comprises end portions 24*a–g* having smooth grinded surfaces and thereby directly engageable with the smooth grinded element 19, around a respective one of the passages 23*a–g*.

Provisions have been made for the mutual smoothness between the armature end portions 24*a–g* acting as valve bodies and the smooth grinded valve surfaces around the passages 23*a–g* for permanently encompassing or housing between said surfaces and end portions at least a molecular layer of the ink or the character recording liquid in the chamber 11. In this way there is formed an efficient protective layer, existing also at a "closed valve", meaning that wear is effectively eliminated.

In FIG. 2*a* housing 10' includes an ink chamber 11' and a number of microprocessor controller ink jet valves 12', of which three are shown on the drawing, but the entire printer may for instance comprise seven closely arranged valves 12'.

In the housing 10 there are sleeve shaped elements 13' mounted by means of sealing gaskets 14', which prevent liquid from the chamber 11' from emerging between the housing 10' and the respective element 13'. In a respective element 13' there is inserted a sleeve 15' acting as a guide for an armature 16' of a magnetic material displaceable longitudinally in the sleeve. At each upper end of a sleeve in the figure there are sealingly arranged "cores" 17' of magnetic material, and said cores are interconnected by (not shown) electromagnet coils, which according to prior art are arranged individually to attract a respective armature 16' against the action of a spring member 18'. In the embodiment in FIG. 1 the springs comprises helical pressure creating springs, which are tensioned between the lower end of a respective one of the elements 13' and a valve head 19' centering the end of the sleeve 15' extending from the element.

Figure 2:
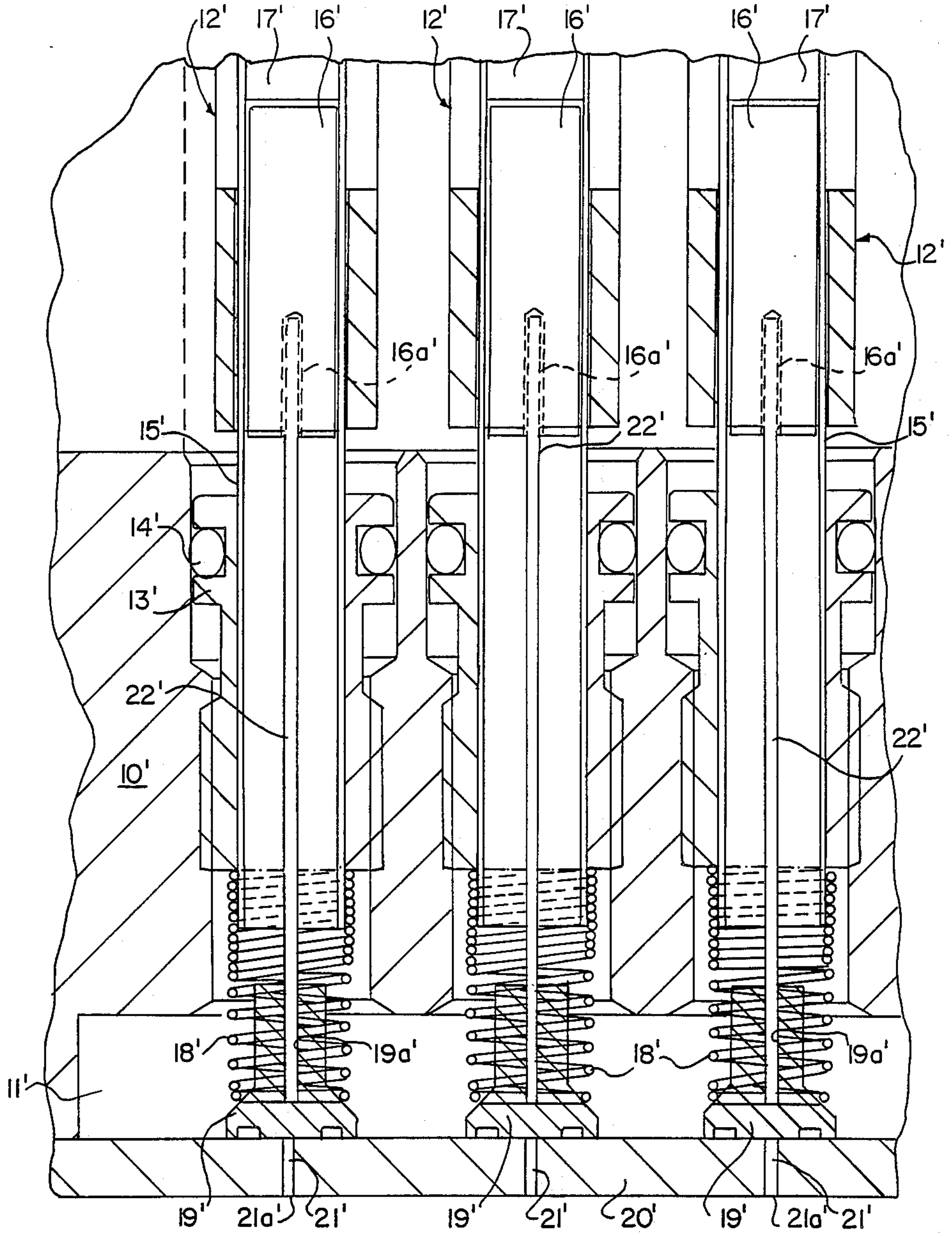
FIG. 2 is a very enlarged scale shows a broken cross section through a matrix printer of the ink jet type according to the invention.

The lower end of the valve head in FIG. 2 is absolutely smooth grinded and abuts a thin plate 20' in which passages 21' are drilled opposite to a respective one of the valve heads 19'. Said heads are connected to a respective one of the armatures 16' by a piece of wire 22' of a flexible material, for instance stainless spring steel. The piece of wire is mounted in bores 16*a'*, 19'*a* in the armature 16' and the valve head 19', respectively, for instance by a curable binder or by shrinking. The flexible portion 22' allows the spring members 18' to bring the plane surface of the valve head 19' into parallel abutment against the smooth surface of the plate 20'. Hereby an almost perfrect seal of the ink output opening 21'*a* is obtained. Due to the fact that the flexible portion 22' mainly is affected by stretching strains, it may be given a weak design meaning a substantial reduction of the weight of the movable elements of the matrix printer. This means also that the spring member may be given a weaker design, meaning that the reaction time of such elements may be decreased.

Figure 3:
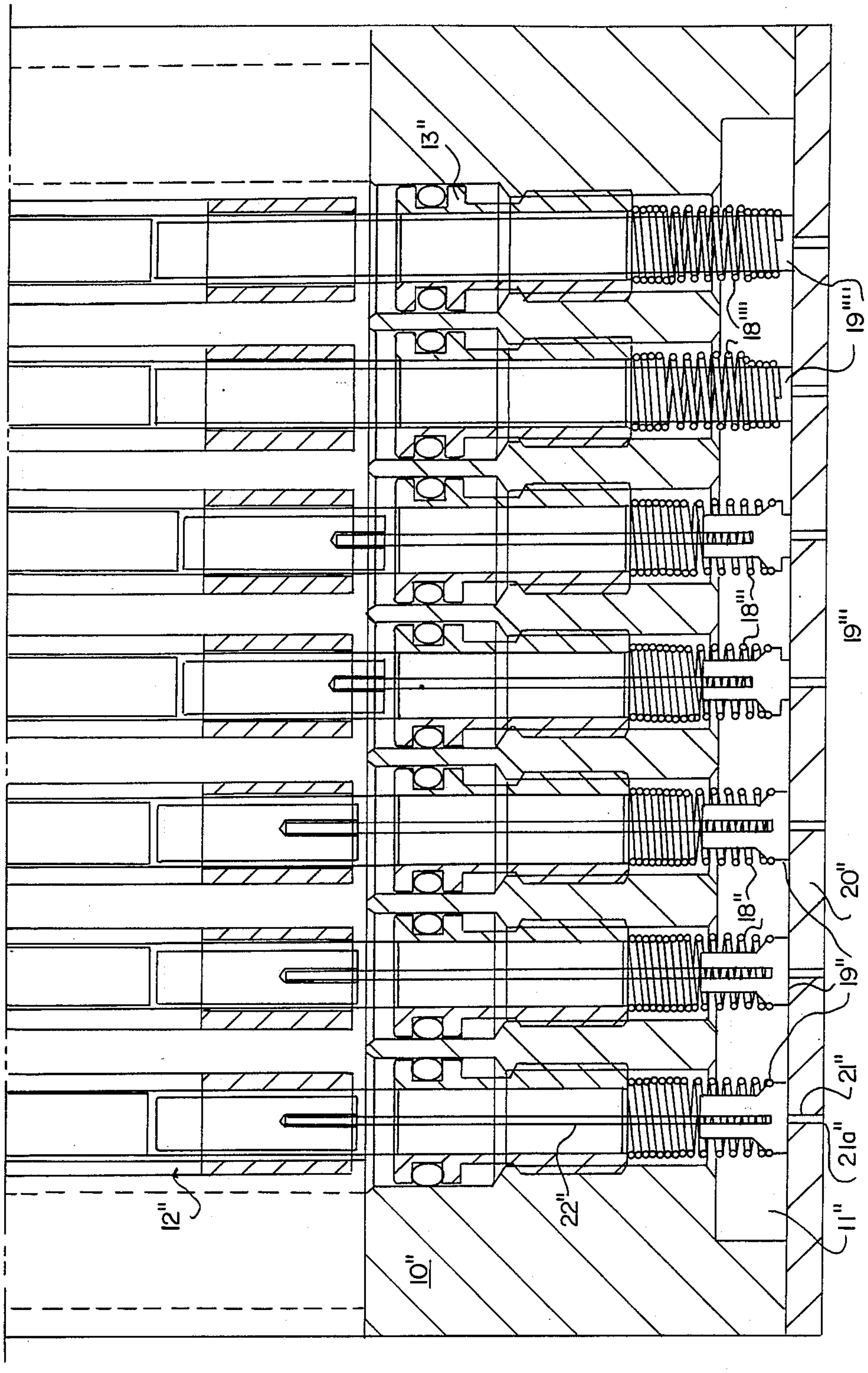
FIG. 3 shows an example of an alternative embodiment of a valve head.

In FIG. 3 there is shown in one and the same matrix head three different types of valve heads 19'', 19''' and 19''''. The first valve type at the extreme leftwards position in the figure has an infinitesimal recess in the end thereof facing the plate 20″. An absolutely smooth, circumferential edge region guarantees an effective seal and the ink volume of the "microscopic space" does not create any problems as far as the free passages 21″ are concerned but will be maintained in the recesses. However, the recesses do considerably reduce the adhesion force acting at absolutey smooth surfaces, meaning that the present system requires a lower operation force at one and the same operation speed.

The mechanical stability of the valve head is determined by the cross section area of the abutment end. The embodiment 19′ is such that the relation between the head area and the openings mentioned at the introduction falls within the interval 1:5–1:10.

The same conditions are met by the valve heads indentified by 19‴. A spring attachment of previous type is used, but the size of the abutment end has been reduced. Having in mind that the abutment surface is moderate, a "micro-recess" has been eliminated.

The version 19⁗ makes use of another type of spring and has also a plane abutment end.

The invention is not limited by the embodiments described, instead several versions are possible within the scope of the accompanying claims. For instance the flexible portion 22″ may be obtained by machining an elongated armture 16″, the outer end of which forms the valve head 19″.

Although the specific embodiments merely disclose a few embodiments of a printer device according to the present invention, it is realized that the invention, of course, is defined exclusively by the accompanying claims.

We claim:

1. In a device for providing liquid tight closure and opening, respectively, of a passage in a printer device for generating characters by the output of a certain amount of liquid for character recording, for instance ink, through the passage, comprising an armature provided with a valve body having a head portion in the passage, and means for a controlled armature reciprocating movement for obtaining said closure and opening operations, the improvement:

wherein the passage is formed in a plate-shaped, grindable element that is grindable to a smooth condition with a long term maintenance of the smoothness and generally free from internal strains, and wherein the head portion has an at least partially smooth surface for direct abutment against the smooth grinded element, around the opening of the passage facing the armature.

2. A device as in claim 1, wherein the valve body is connected to the armature via a flexible portion that allows angle positioning of the valve head portion relative to the longitudinal axis of the armature, such that a generally planar surface of the head portion under the action of a spring member may be brought into a position parallel against the plate having said ink outlet passage arranged therein.

3. A device as in claim 2, wherein the flexible portion extends up to a level of the spring member inserted between the valve and a coaxial sleeve element.

4. A device as in claim 2, wherein an electromagnet is arranged for attracting the valve head against the action of the spring member from a rest position with the head in abutment against the plate shaped grindable element.

5. A device as in claim 2, wherein the flexible portion comprises a wire formed by drawing spring steel.

6. A device as in claim 5, wherein the wire is attached in a central bore in the armature and the valve head, respectively, by means of a binder.

7. A device as in claim 5, wherein the wire is attached in a central bore of the armature and the valve head by shrinking.

8. A device as in claim 7, wherein the valve head portion has a cross section at the abutment end passage thereof, which meets the requirement of a relation between the cross section area and opening area falling in the interval 1:5–1:10.

9. A device as in claim 7, wherein the abutment end of the valve head portion has a recess of a depth of some μm formed therein.

10. A device as in claim 9, wherein the recess encompasses an integral edge region having a smooth abutment surface.

11. A device as in claim 1, wherein the material of the plate shaped grindable element is a material or a combination of materials from the following group of materials: quartz glass, ceramics, for instance $BrO_2$, $AlO_2$, hard metal sintered carbides (metal and ceramics) and reinforced plastics, for instance carbon fibre reinforced plastics.

12. A device as in claim 2, wherein the valve body is made from a magnetic material, preferably stainless steel, or a ferrite.

13. A device as in claim 1, wherein the combined smoothness between the valve body end portion and the area of the plate-shaped element around the passage is such that there permanently is at least a molecular layer of the character recording liquid maintained between the valve body end portion and the plate-shaped element, whereby wear is effectively prevented.

14. A device as in claim 13, wherein the armature is supported in a sleeve shaped guide and a spring device is arranged for providing a force against the armature parallel to the centre axis of the sleeve and centrally around the centre axis thereof as soon as the armature is displaced from a rest position.

15. A device as in claim 14, wherein the spring is formed as a helical spring having one end thereof attached to the sleeve and the other close to the armature end portion, and that the spring cross section diminishes in a direction towards the end portion.

16. A device as in claim 15, wherein in an electromagnetic coil is arranged at the end of the armature distal to the passage.

17. A device as in claim 1, wherein the total extension of the passage coincides with the thickness of the plate shaped element, which is relatively thin, of the order of some millimetres, meaning that a short passage is formed.

* * * * *